FILTER

Filed Dec. 27, 1954

INVENTOR
FRANK W. YEAGLEY
BY Marvin Moody
ATTORNEY

United States Patent Office 2,835,873

Patented May 20, 1958

2,835,873

FILTER

Frank W. Yeagley, Dallas, Tex., assignor to Collins Radio Company, Cedar Rapids, Iowa, a corporation of Iowa Application December 27, 1954, Serial No. 477,367

1 Claim. (Cl. 333—73)

This invention relates to electrical wave filter circuits and more particularly to such circuits which provide a frequency band elimination.

It is oftentimes desirable to have a filter circuit which provides a very high attenuation over a very narrow frequency band, thereby eliminating a particular undesired frequency and as narrow a frequency band adjacent thereto as possible. Priorly, band elimination filters have been constructed which were fixed frequency elimination circuits and which provided the necessary attenuation to eliminate the frequency and an adjacent bandwidth. It has not been particularly feasible to use variable filters which are tunable over a specific frequency range and obtain the desired attenuation throughout the frequency range. This invention provides a band elimination filter which is variable and which produces an attenuation curve which is peaked to an unusual degree. This invention provides large attenuation of a very narrow frequency band and thus permits greater tuning accuracy, i. e., a greater rejection of unwanted frequencies near the tuned frequency.

Figures 2, 3:
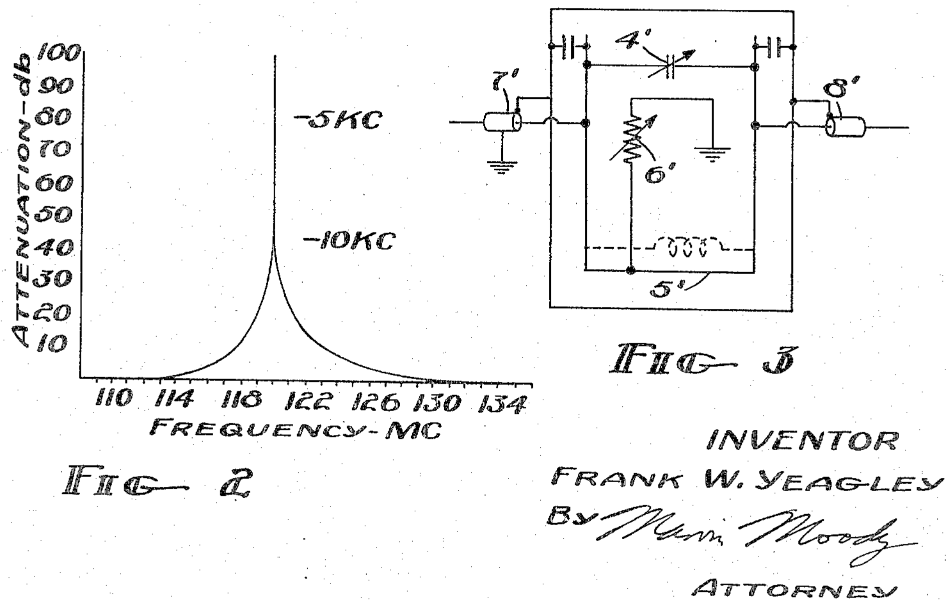

It is an object of this invention to provide a band elimination filter utilizing novel lumped constant components. It is a further object of this invention to provide for increased attenuation for elimination of a very narrow frequency band. It is a still further object of this invention to provide an economical frequency band elimination filter which is capable of markedly attenuating frequencies from 30 megacycles upward. This and other objects of this invention will become apparent when the following description is read in conjunction with the accompanying drawings, in which Figure 1 depicts the band elimination filter of this invention;

Figure 2 is an attenuation versus frequency curve for the filter of this invention when tuned to 120 megacycles; and Figure 3 is a schematic representation of this invention.

Figure 1:
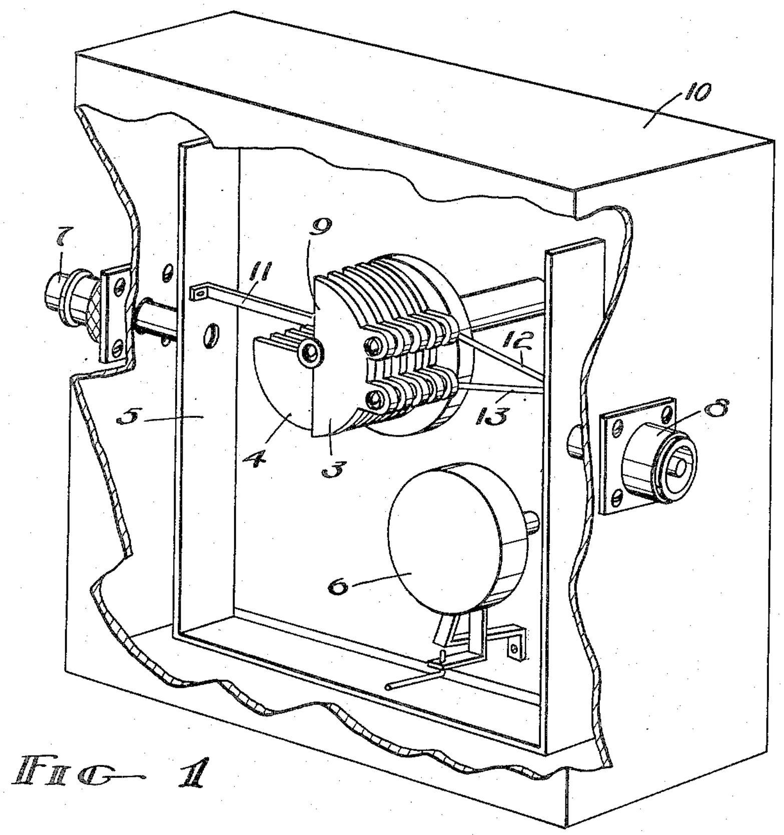

Referring now to Figures 1 and 3, this filter is composed of a tunable condenser having fixed plates 3 and rotary plates 4 as shown in Figure 1. This tunable condenser is shown in Figure 3 as 4′. The U-shaped strap 5 comprising the novel inductive element of this filter in Figure 1 is depicted as 5′ in Figure 3. The variable resistor 6 provides variable resistance as necessary to perform the proper tuning of this circuit and as shown in Figure 3 as 6′ is also connected to ground. The input and output leads or coaxial terminals are 7 and 8, and 7′ and 8′.

The input coaxial terminal 7 is connected to one side of the U-shaped strap 5. Connected also to this side is a connector 11 connecting strap 5 to the tuning condenser 9. The other side of the tuning condenser 9 is connected by two leads or connectors 12 and 13 to the other side of the U-shaped strap. Thus, the condenser 9 is connected directly across the open side or end of the U-shaped strap 5. One side of the rotary resistor 6 is connected to the closed end of the strap 5 and its other side is connected to ground. The output or other coaxial terminal 8 is connected to the U-shaped strap 5 on the same side as the terminals 12 and 13 which is the opposite side of the U-shaped strap from the coaxial terminal 7.

The tuning of this filter is done by varying the capacitance across the U-shaped strap and by varying the resistance in series with the U-shaped strap. The mathematical derivative of this system is not presented here, as the theory of elimination filters is well known. The width of the U-shaped strap and its spacing from its housing 10 is such that an impedance equal to the impedance of the incoming and outgoing lines is maintained when the strap and the variable condenser are not tuned to resonance. This reduces insertion losses and impedance mismatches at frequencies other than the resonant frequency.

This invention presents a novel lumped constant component connected in a new and novel way to produce a very accurate and steep attenuation. There is no change in the theory of operation from that normally expected in band elimination filters; however, the filter is constructed in a novel way to produce unexpectedly sharp attenuation.

As illustrated by Figure 2, the use of this novel conductive element 5 in combination with a rotary condenser and a variable resistor and connected in the novel manner as shown in Figure 1 produces an attenuation curve which provides twice the attenuation in decibels at the tuned frequency as the attenuation at 5 kilocycles on either side of the tuned frequency. It is thus possible to attenuate the unwanted frequency and have the attenuation curve so sharply sloped that a very narrow frequency band is also eliminated. In actuality with this invention the frequency band eliminated is approximately .010 percent of the mid-frequency at a mid-frequency of 120 megacycles.

Although this invention has been described with respect to a particular embodiment thereof, it is not to be so limited as changes and modifications may be made therein which are within the full intended scope of the invention as defined by the appended claim.

What I claim is:

A filter circuit comprising a coaxial input connection, said connection including a center conductor and an external ground connection, an inductive element comprising a U-shaped strap of flat conductive material, said center conductor of said coaxial input connected to one side of said U-shaped strap, a ground reference potential means comprising a casing for said filter circuit, a variable resistive element having one side connected to the closed side of said U-shaped strap and the other side connected to ground, a second coaxial connection means connected to the other side of said U-shaped strap, said coaxial connection means comprising a center conductor and an external ground connection, a tunable rotary condenser having its rotary plates electrically connected to one side of said U-shaped strap and having its fixed plates connected to the opposite side of said U-shaped strap, said rotary plates connected by a single means and said fixed plates connected by a plurality of means, said U-shaped strap physically related to said casing so as to match the impedances of said first and said second coaxial connections, whereby the maximum attenuation of said circuit may occur at varied frequencies.

References Cited in the file of this patent

UNITED STATES PATENTS

| | | |
|---|---|---|
| 2,207,796 | Grundmann | July 16, 1940 |
| 2,442,615 | Percival | June 1, 1948 |
| 2,576,329 | Bell | Nov. 27, 1951 |
| 2,582,726 | Van Weel | Jan. 15, 1952 |
| 2,629,081 | Hubbard | Feb. 17, 1953 |
| 2,702,373 | Pan | Feb. 15, 1955 |